Figure 1:
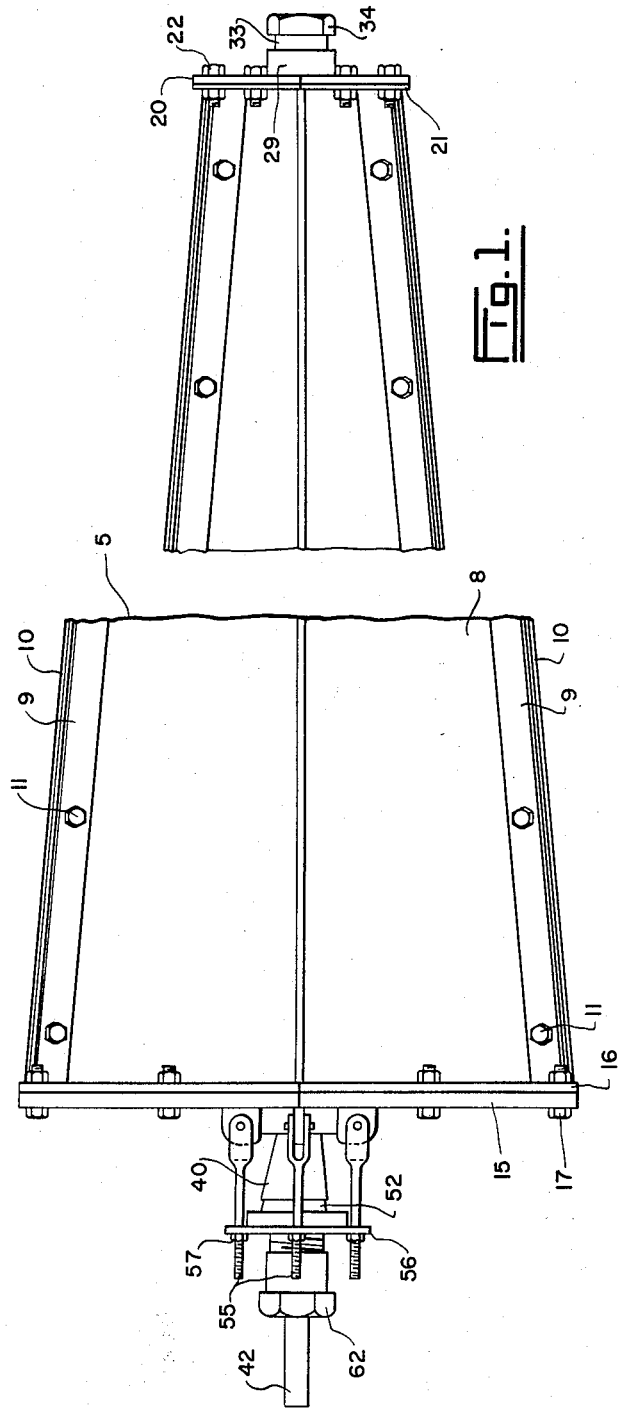

April 21, 1959 L. S. McLENNAN 2,882,582
CORE APPARATUS FOR MOLDING ARTICLES OF PLASTIC MATERIAL
Filed Nov. 17, 1953 2 Sheets-Sheet 1

INVENTOR
LOGAN S. M LENNAN
BY
Featherstonhaugh & Co.
ATTORNEYS

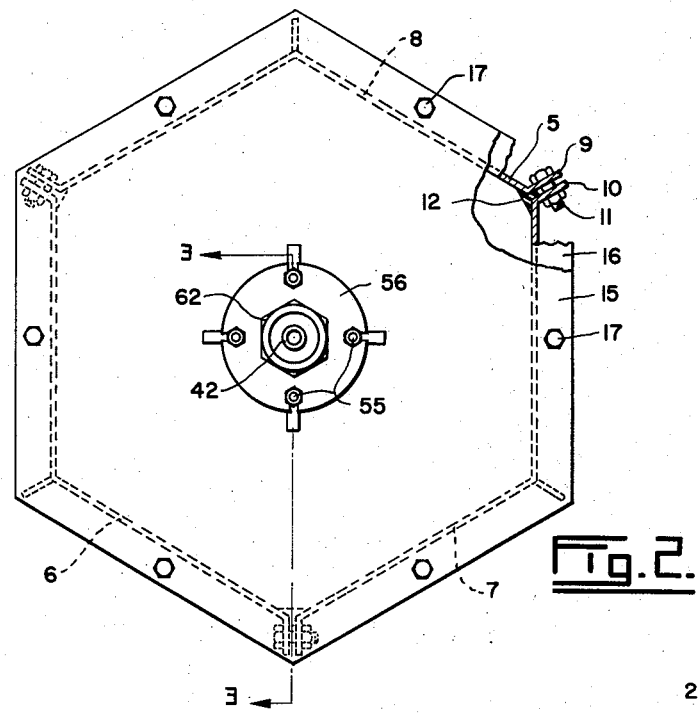
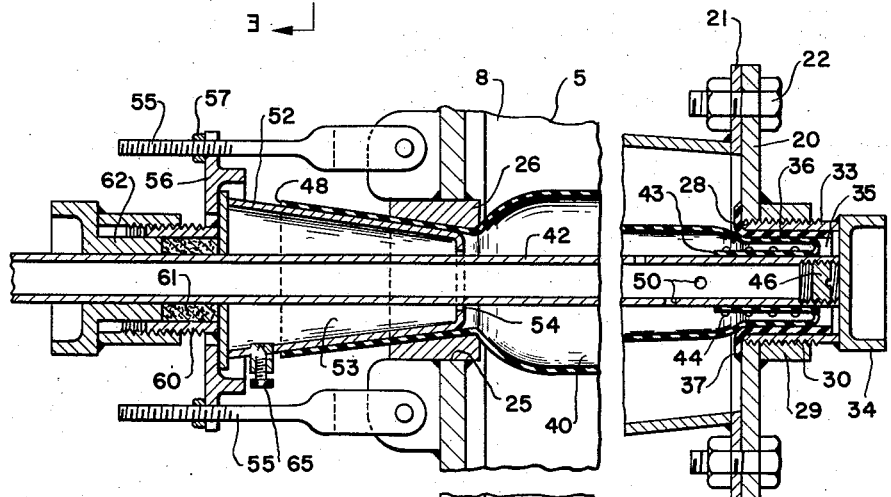
Fig. 2.
Fig. 3.
INVENTOR
LOGAN S. M LENNAN
BY
Fetherstonhaugh&Co.
ATTORNEYS

United States Patent Office 2,882,582
Patented Apr. 21, 1959

2,882,582

CORE APPARATUS FOR MOLDING ARTICLES OF PLASTIC MATERIAL

Logan S. McLennan, Vancouver, British Columbia, Canada

Application November 17, 1953, Serial No. 392,665

10 Claims. (Cl. 25—126)

This invention relates to apparatus for molding articles, such as poles, of plastic material, such as concrete.

The main purpose of this invention is the provision of apparatus for manufacturing relatively long articles, such as poles, posts, piles and the like, of concrete or other plastic material. These articles may be provided with conventional or pre-stressed reinforcement. The merits of concrete poles have long been recognized, but prior to this invention there was no way to utilize this material effectively. The ingredients for mixing concrete are available practically everywhere, and concrete withstands weathering and deterioration much better than most other substances, and requires comparatively little maintenance.

Another object is the provision of cast concrete poles of greater strength than ordinary concrete poles, and which are much lighter than the latter.

In manufacturing tubular porducts of concrete, the process generally employed is to rotate the plastic mix in a mold so as to consolidate the material by centrifugal force. While this is very effective for articles like pipe, made in short lengths and having a reasonably large diameter, the method is not practical for long slender sections as required in poles. Rotation of a long member presents considerable difficulty regarding equipment, space and alignment. Moreover, because centrifugal force diminishes with reduction in diameter, effective compaction cannot be secured in slender members even by spinning at excessive speed.

The present invention avoids these objections by utilizing the same force as is derived centrifugally to consolidate the mix. This is accomplished by means of an internal pressure inserted radially from a central core in the article. The material forming the article is confined within a mold or casing as the internal pressure is applied. Thus, it is not necessary to rotate the article and the size thereof is not limited by any mechanical considerations. Entrained air is squeezed out of the mix to increase the density of the concrete, thereby increasing its strength. Surface defects caused by bubbles clinging to the inner surface of the mold or casing are reduced or eliminated.

The apparatus of this invention comprises a mold casing and a core bag formed of expansible and fluid-impervious material extending axially thereof. Suitable means is provided for directing a fluid into the bag to expand the latter to compress a plastic material surrounding the bag within the casing. It is preferable to form the casing in sections removably connected together. It is desirable to use a core bag of tubular form, one end of which is connected to a pipe. This pipe extends longitudinally through the bag and has holes therein opening into the latter. Fluid is directed into the bag through this pipe, and after the material forming the article has set, the bag is removed therefrom by drawing the pipe outwardly from the casing.

An example of this invention is illustrated in the accompanying drawings, in which, Figure 1 is a plan view of the molding apparatus, Figure 2 is an end elevation of the apparatus, and Figure 3 is an enlarged longitudinal section taken substantially on the line 3—3 of Figure 2, showing the core bag in its expanded position.

Referring to the drawings, 5 is an elongated casing which is preferably formed in sections to make it collapsible. In this example, the casing is formed in three sections, 6, 7 and 8, the latter being at the top when the casing is in a horizontal position and forming a cover section. The sides of the sections may be formed with matching flanges 9 and 10 connected together in any convenient manner, such as by nuts and bolts 11, and, if desired, suitable gaskets 12 may be placed between adjacent flanges.

As the illustrated apparatus is particularly designed for making tapered poles of hexagonal cross section, the illustrated casing tapers from one end to the other and is hexagonal in cross section. Each of the sections 6, 7 and 8 is in the form of a shallow V, and they may be identical, as clearly shown in Figure 2. One end of the casing is closed by a wall 15 removably connected to the ends of the casing sections. This may be accomplished by providing each section with a flange 16 projecting outwardly from the end thereof and which is connected to the end wall 15 by nuts and bolts 17, see Figures 2 and 3. The opposite end of the casing is closed by a smaller wall 20. Each casing section may be provided at this end with an outwardly-projecting flange 21 overlapped by the wall 20 and to which the latter is secured by bolts 22.

The end wall 15 may be formed with a hole or opening 25 centrally thereof in which a seat 26 is located. The inner surface of this seat preferably diverges outwardly from the casing, as clearly shown in Figure 3. Similarly, the end wall 20 may be formed with a hole or opening 28. An annular collar 29 is secured to and extends outwardly from the end wall 20 around the opening 28 thereof. The inner surface of this collar and the end wall at its opening are threaded, as indicated at 30. An externally threaded tubular sleeve 33 is threaded into the collar 29 and the opening 28, and has a large head 34 on its outer end and by means of which it may be turned to insert it in or remove it from the collar. The hollow sleeve 33 opens into the casing 5 and forms a pocket 35 communicating with the interior of the latter, while the outer end of the sleeves is closed by head 34. A liner 36 removably and snugly fits into this pocket and has a flange 37 at its inner end overlapping and bearing against the inner surface of the wall 20. This flange protects the threads on the collar 29 and sleeve 33.

A core bag 40 of suitable expansible and fluid-impervious material, such as rubber, or rubber composition, is removably fitted in and extends longitudinally of the casing 5. This bag may taper from a large end adjacent the end wall 15 to a smaller end at the opposite end of the casing. However, it is preferable that this bag be in the form of a straight-sided tube, in which case the bag will assume its tapered shape as shown in Figure 3 when it is inflated. This will be hereinafter explained.

In order to facilitate the removal of the core bag from a finished article, it is mounted on a pipe 42. This pipe extends longitudinally through the bag, and the inner end 43 of the latter is turned inwardly of the tube and secured to the adjacent end of the pipe in any convenient way, such as by means of a spirally wound wire 44. Actually, the end 43 of the bag is secured to the pipe end, after which the bag is turned inside out to extend along the pipe. The adjacent end of the pipe may be internally threaded removably to receive a plug 46. The opposite or outer end 48 of the bag extends outwardly from the casing through the tapered seat 26. The pipe has a plurality of holes 50 therein through which a fluid, such as air, steam or water, may be directed into the bag. The opposite end of the pipe is connected to a suitable source of air, steam or water, not shown. For most purposes, an additional pipe, not shown, is connected to an air pump at one time and to a source of hot water at another.

The outer end 48 of the core bag 40 is closed in any desired manner. In this example, a plug 52 fits into the bag end, said plug being tapered to fit within the tapered seat 26. The pipe 42 extends through this plug, and the latter is preferably hollow, as indicated at 53, in which case the inner end of the plug opens into the core bag through a hole 54 in said plug end and which is larger than the pipe.

Suitable means is provided for clamping the plug 52 against the seat 26. In this example, a plurality of threaded bolts 55 project outwardly from the end wall 15 of a casing around the opening 25 in said end. A ring 56 is slidably mounted on these bolts and overlaps the outer end of the plug. When nuts 57 are tightened on these bolts, the plug is pressed into the end 48 of the core bag within the seat and clamps said end against the latter. A packing gland 60 is formed on the outer end of the plug surrounding the pipe 42. Packing 61 is retained in this gland by a packing nut 62.

It is desirable to provide an outlet valve 65 in the plug 52 outside the end 48 of the core bag. This valve may be such that it opens under a predetermined pressure, or it may have to be opened manually, as shown.

In order to use this apparatus, the casing sections 6 and 7, and the end walls 15 and 20 are bolted together but the top section 8 is left off. The concrete or other suitable plastic material is poured into the casing 5 through the opening which extends longitudinally thereof at its top. When the casing is nearly half full, the pipe 42 with the core bag 40 attached thereto is moved through the seat 26 into the casing and into the pocket 35 at its small end. After this is done, the plug 52 is inserted into the outer end 48 of the bag to clamp said end against the tapered seat 26. The ring 56 is placed over the bolts 55, and the nuts 57 are tightened down to drive the plug into position. The packing nut 62 may now be tightened against the packing 61 of the gland 60. The rest of the concrete or plastic material is then poured into the casing almost to the top thereof. When this is done, the top section 8 is clamped in position on the casing sections 6 and 7.

With the valve 65 closed, a fluid is directed under pressure through the pipe 42 into a core bag to inflate the latter. The fluid most commonly used for this purpose is air. As the bag expands it compresses the material surrounding it against the inner surfaces of the casing. As there is more air in a given cross section of the concrete at the large end of the casing than there is in the corresponding cross section at the small end thereof, there will be more compression of the concrete at said large end so that the bag will expand more at that end than at the opposite end. This internal pressure reduces the size of air bubbles at the outer surface of the concrete against the casing so that a smoother finish is obtained at the outer surface of the pole than would be obtained by ordinary casting methods. If desired, the casing may be provided with a liner formed of porous material, such as cardboard, to absorb most of the air at the concrete surface. The internal pressure also decreases the size of the voids in the concrete which are formed by air therein so that a stronger finished article is obtained. The smaller voids are a result of the fact that the air in the concrete is compressed into small spaces.

If it is desired to hasten the curing of the concrete, hot air, water or steam may be directed through the pipe 42 into the core bag. At this time, the valve 65 is open so that there is a circulation of the fluid through the bag. When the concrete has cured sufficiently, the core bag is withdrawn from the centre of the cast member by pulling the pipe 42 outwardly. The plug 52 is removed before this is done, and the withdrawal of the pipe turns the core bag inside out as it leaves the casing. The mold casing 5 may now be stripped from the pole.

Although not absolutely necessary, the casing 5 may be rotated slowly during the time the core bag is being inflated to compress the concrete. While no mention has been made of inserting reinforcing rods in the concrete, it is obvious that such rods may be placed therein either as the concrete is poured, or before the pouring if suitable means are provided for holding the rods in position. For this purpose, there is no reason why the rods should not extend through holes in the end walls 15 and 20 of the molded casing. Furthermore, these rods could be pre-stressed in any convenient manner.

In addition to the apparatus described above, this invention includes the method of forming articles, particularly poles and the like, of plastic material which comprises confining the material in a closed casing, and applying internal pressure to compress the material against the inner surface of the casing. The internal pressure may be applied by inflating a resilient core bag within the material in the casing. This internal pressure provides the necessary consolidation of the material, reduces or eliminates air bubbles at the outer surface of the material, and greatly reduces the size of air bubbles within the material.

What I claim as my invention is:

1. Apparatus for molding articles of plastic material, such as concrete and the like, comprising a casing having walls at opposite ends thereof, one end of the casing having an opening therein centrally thereof, a sleeve extending through said opening and communicating with the interior of the casing, the outer end of said sleeve being closed to form a pocket, the opposite end of the casing having a central opening therein, a pipe extending through said central opening and into the pocket at the opposite end of the casing, a core bag secured at one end to the end of the pipe in the pocket and extending back enclosing the pipe to and through said other opening, the pipe and bag ends in the pocket being free of the latter and plug means removably fitting into the end of the bag around the pipe for clamping said end against said other opening and closing the bag, the portion of the pipe within the bag having a hole therein, said bag expanding when a fluid is directed into it through the pipe to compress a plastic material surrounding the bag in the casing, and said bag being withdrawn from the plastic material when the plug is removed from the bag opening by drawing the pipe longitudinally out of the casing, said bag turning inside out during this operation.

2. Molding apparatus as claimed in claim 1 in which the end of the bag secured to the pipe is turned inwardly of the bag so that the latter extends back over said end.

3. Apparatus for molding articles of plastic material, such as concrete and the like, comprising a casing having walls at opposite ends thereof, one end of the casing having an opening therein centrally thereof, a sleeve extending through said opening and communicating with the interior of the casing, the outer end of said sleeve being closed to form a pocket, the opposite end of the casing having a central opening therein, a pipe extending through said central opening and into the pocket at the opposite end of the casing, a seat in said central opening, a core bag secured at one end to the end of the pipe in the pocket and extending back enclosing the pipe to said other opening the pipe and bag ends in the pocket being free of the latter, a tubular end formed on the bag and extending through the seat, a plug outside the casing and removably extending into the tubular end of the bag, and means for pressing the plug into the tubular end within the seat to clamp said end against the latter, said pipe extending through the plug, and said bag being withdrawn from the plastic material when the plug is removed from the tubular end of the bag by drawing the pipe longitudinally out of the casing, said bag turning inside out during this action.

4. In apparatus for molding hollow articles of plastic material, core apparatus to be placed in a casing having walls at opposite ends thereof, one end of said casing having an opening therein centrally thereof with a seat in said opening, said core apparatus comprising a pipe to extend through the opening in the end of a casing and having an inner end near the opposite end of the latter, an elongated core bag formed of expansible and fluid-impervious material surrounding the pipe, means inside the bag clamping an end thereof to the inner end of the pipe, said clamping means being movable with the pipe and the portion of the pipe within the bag having a hole therein, said bag having an opening in the end thereof opposite the end clamped to the pipe, a tubular end formed with the bag around the opening therein to extend through the casing seat, said tubular end being free of the pipe, a hollow plug slidably mounted on the pipe and removably fitting in the tubular end to close the bag opening, the interior of said plug communicating with the interior of the bag, and an outlet valve in the plug outside the tubular bag end.

5. Apparatus as claimed in claim 4 including packing means at the plug around the pipe to prevent leakage of fluid from the bag.

6. Apparatus as claimed in claim 4 in which the plug diverges in a direction outwardly from the bag.

7. Apparatus as claimed in claim 4 including means at the plug to be connected to the casing end with the opening therein for pressing said plug into the tubular end of the bag.

8. Apparatus as claimed in claim 4 including a ring surrounding the pipe and overlapping the outer end of the plug, a plurality of threaded bolts arranged around the pipe and slidably extending through said ring, said bolts being connectable to the casing end with the opening therein, and nuts on the bolts to be tightened to press the plug into the tubular bag end, whereby to clamp said tubular end against the casing seat when the core apparatus is inserted in a casing.

9. Apparatus as claimed in claim 4 in which the end of the bag secured to the pipe is turned inwardly of the bag so that the latter extends back over said end.

10. In apparatus for molding hollow articles of plastic material, core apparatus to be placed in a casing having walls at opposite ends thereof, one end of said casing having a central opening therein and the second casing having an opening therein with a sleeve extending through the latter opening and communicating with the interior of the casing, the outer end of said sleeve being closed to form a pocket, said core apparatus comprising a pipe extending through the casing end openings and into said pocket, an elongated core bag formed of expansible and fluid-impervious material surrounding the pipe and extending into the pocket, the end of the bag in the pocket being turned inwardly over the pipe, means clamping said inturned bag end to the pipe, said clamping means being movable with the pipe and the portion of the pipe within the bag having a hole therein, said bag having an opening in the end thereof opposite the end clamped to the pipe, a tubular end formed with the bag around the opening therein to extend through the casing seat, said tubular end being free of the pipe, a hollow plug slidably mounted on the pipe and removably fitting in the tubular end to close the bag opening, the interior of said plug communicating with the interior of the bag, and an outlet valve in the plug outside the tubular bag end.

References Cited in the file of this patent

UNITED STATES PATENTS

| 1,142,341 | McNeil | June 8, 1915 |
| 1,319,216 | Goddard | Oct. 21, 1919 |
| 1,363,912 | Pauly | Dec. 28, 1920 |
| 1,552,064 | Lake | Sept. 1, 1925 |
| 1,566,903 | Durst | Dec. 22, 1925 |
| 1,605,782 | Rota | Nov. 2, 1926 |
| 1,624,191 | Venzie | Apr. 12, 1927 |
| 1,624,704 | Adams | Apr. 12, 1927 |
| 1,715,920 | Henry | June 4, 1929 |
| 1,846,279 | Speirs | Feb. 23, 1932 |
| 2,062,767 | Sexton | Dec. 1, 1936 |
| 2,296,620 | Tinker | Sept. 22, 1942 |
| 2,405,245 | Ushakoff | Aug. 6, 1946 |
| 2,730,763 | Brundage | Jan. 17, 1956 |

FOREIGN PATENTS

| 658,684 | Germany | Apr. 25, 1938 |